(12) United States Patent
Furumachi et al.

(10) Patent No.: US 10,794,446 B2
(45) Date of Patent: Oct. 6, 2020

(54) VIBRATION DAMPING DEVICE

(71) Applicant: SUMITOMO RIKO COMPANY LIMITED, Komaki-shi, Aichi (JP)

(72) Inventors: Naoki Furumachi, Komaki (JP); Takayoshi Yasuda, Komaki (JP); Hiroyuki Ichikawa, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 16/168,979

(22) Filed: Oct. 24, 2018

(65) Prior Publication Data

US 2019/0277362 A1    Sep. 12, 2019

(30) Foreign Application Priority Data

Mar. 12, 2018 (JP) .................................. 2018-043837
Jul. 19, 2018 (JP) .................................. 2018-136125

(51) Int. Cl.
*F16F 13/10*    (2006.01)
*F16F 1/38*    (2006.01)
(Continued)

(52) U.S. Cl.
CPC .............. *F16F 1/3842* (2013.01); *F16F 1/54* (2013.01); *F16F 13/107* (2013.01); *F16F 13/262* (2013.01); *F16F 2226/04* (2013.01)

(58) Field of Classification Search
CPC .......... F16F 1/3842; F16F 1/54; F16F 13/107; F16F 13/10; F16F 13/108; F16F 13/262; F16F 2226/04
(Continued)

(56) References Cited

U.S. PATENT DOCUMENTS 5,295,671 A * 3/1994 Nakagaki ................ F16F 13/10
                                                     248/638
6,131,894 A * 10/2000 Satori .................... F16F 13/108
                                                    267/140.13
(Continued)

FOREIGN PATENT DOCUMENTS

| JP | S62-046841 U1 | 3/1987 |
| JP | 2016-065556 A | 4/2016 |
| JP | 2016-114144 A | 6/2016 |

OTHER PUBLICATIONS

May 29, 2020 Office Action issued in Chinese Patent Application No. 201811357527.4.

*Primary Examiner* — Thomas W Irvin
(74) *Attorney, Agent, or Firm* — Oliff PLC

(57) ABSTRACT

A vibration damping device including a main rubber elastic body elastically connecting first and second mounting members. An upper portion of the main rubber elastic body constitutes a small-diameter portion to which the first mounting member is bonded, while a lower portion thereof constitutes a large-diameter portion to which the second mounting member is bonded. The first mounting member includes an inner recess opening onto an outer circumferential surface thereof, and the small-diameter portion of the main rubber elastic body is bonded to the inner recess. The main rubber elastic body has an outside diameter dimension made larger at a portion bonded to the inner recess than an outside diameter dimension of the first mounting member at a lower side than the inner recess such that the small-diameter portion of the main rubber elastic body is thick-walled by being bonded to the inner recess.

10 Claims, 4 Drawing Sheets

(51) Int. Cl.
*F16F 1/54* (2006.01)
*F16F 13/26* (2006.01)

(58) Field of Classification Search
USPC .................................... 267/140.13, 140.11
See application file for complete search history.

(56) References Cited

U.S. PATENT DOCUMENTS

| | | | | |
|---|---|---|---|---|
| 6,267,362 B1* | 7/2001 | Satori | ................... | F16F 13/103 |
| | | | | 267/140.13 |
| 7,007,934 B2* | 3/2006 | Goto | ..................... | F16F 13/108 |
| | | | | 267/140.13 |
| 7,350,776 B2* | 4/2008 | Muramatsu | ........... | F16F 13/105 |
| | | | | 267/140.14 |
| 8,485,506 B2* | 7/2013 | Matsuda | ............... | F16F 13/105 |
| | | | | 267/140.11 |
| 8,517,359 B2* | 8/2013 | Graeve | ................. | F16F 13/262 |
| | | | | 267/140.13 |
| 9,010,738 B2* | 4/2015 | Koga | ..................... | F16F 13/105 |
| | | | | 267/140.13 |
| 9,394,964 B2* | 7/2016 | Yasuda | ................. | F16F 13/107 |
| 9,435,396 B2* | 9/2016 | Matsumoto | ............. | F16F 13/10 |
| 9,488,246 B2* | 11/2016 | Satori | ................... | F16F 13/106 |
| 9,534,655 B2* | 1/2017 | Saito | ....................... | F16F 13/08 |
| 9,752,637 B2 | 9/2017 | Kuki et al. | | |
| 2010/0264569 A1* | 10/2010 | Kojima | ................ | F16F 13/101 |
| | | | | 267/140.11 |

* cited by examiner

VIBRATION DAMPING DEVICE

INCORPORATED BY REFERENCE

The disclosures of Japanese Patent Application Nos. 2018-043837 filed on Mar. 12, 2018 and 2018-136125 filed on Jul. 19, 2018, each including the specification, drawings and abstract is incorporated herein by reference in its entirety.

BACKGROUND OF THE INVENTION

1. Field of the Invention

The present invention relates to a vibration damping device adapted for use as an automotive engine mount or the like, for example.

2. Description of the Related Art

Conventionally, there is known a vibration damping device adapted for use as an engine mount or the like that provides vibration damping connection between a power unit and a vehicular body. The vibration damping device includes, like a liquid-filled vibration damping device as disclosed in Japanese Unexamined Patent Publication No. JP-A-2016-065556, for example, an inner tube serving as a first mounting member and an outer tube serving as a second mounting member that are attached to one and the other of constituent components of a vibration transmission system respectively, and a leg base serving as a main rubber elastic body that connects the inner and outer tubes. When a vibration in the axial direction is input across the inner tube and the outer tube, vibration damping ability will be exhibited by elastic deformation of the leg base.

Meanwhile, the leg base of JP-A-2016-065556 has a tapered shape in which its axially upper portion is made smaller in diameter than its axially lower portion. Accordingly, when a load in the axial direction is input across the inner tube and the outer tube, stress is likely to concentrate on the axially upper portion having the smaller diameter, posing a risk of generating wrinkle-like deformation, cracking or the like at the axially upper portion of the leg base.

In light of that, in JP-A-2016-065556, the inner tube includes an inner-tube recess opening onto the outer circumferential surface of the inner tube. The inner-tube recess is provided to the inner tube at a portion to which the upper end of the leg base is bonded. Meanwhile, the leg base includes at its upper portion a connecting-part recess that corresponds to the inner-tube recess and is formed so as to open onto the outer circumferential surface of the leg base. With this configuration, the upper end of the leg base is arranged between a first projecting part and a second projecting part that constitute the upper and lower wall faces of the inner-tube recess, so as to have a structure that hardly deforms during input of a load in the axial direction.

However, with the structure of JP-A-2016-065556, transmission of input in the axial direction from the first projecting part to the leg base is considerably reduced by the formation of the connecting-part recess. Consequently, in the leg base, shear spring component may predominate and compression spring component may become smaller, posing a risk of deteriorating a degree of freedom in tuning spring characteristics.

SUMMARY OF THE INVENTION

It is therefore one object of this invention to provide a vibration damping device of novel structure which is able to obtain a large degree of freedom in tuning spring characteristics, while moderating stress concentration on a small-diameter portion of a main rubber elastic body, thereby improving durability.

The above and/or optional objects of this invention may be attained according to at least one of the following modes of the invention. The following modes and/or elements employed in each mode of the invention may be adopted at any possible optional combinations.

Specifically, a first mode of the present invention provides a vibration damping device comprising: a first mounting member; a second mounting member; and a main rubber elastic body elastically connecting the first and second mounting members, an upper portion of the main rubber elastic body serving as a small-diameter portion to which the first mounting member is bonded, while a lower portion of the main rubber elastic body serving as a large-diameter portion to which the second mounting member is bonded, wherein the first mounting member includes an inner recess opening onto an outer circumferential surface thereof, and the small-diameter portion of the main rubber elastic body is bonded to the inner recess, and the main rubber elastic body has an outside diameter dimension made larger at a portion bonded to the inner recess than an outside diameter dimension of the first mounting member at a lower side than the inner recess such that the small-diameter portion of the main rubber elastic body is thick-walled by being bonded to the inner recess.

According to the vibration damping device structured following the first mode, since the inner recess is provided to the first mounting member, at the small-diameter portion of the main rubber elastic body on which the stress is likely to be concentrated during its elastic deformation, the thickness dimension is greatly obtained. This may disperse the stress at the small-diameter portion, thereby improving durability of the main rubber elastic body.

Moreover, with the main rubber elastic body, the portion bonded to the inner recess is not arranged so as to be get caught entirely in the inner recess but projects radially outward with respect to the portion of the first mounting member situated on the lower side than the inner recess, thereby readily undergoing elastic deformation with respect to the vibration input in the up-down direction. Therefore, the substantial thickness of the main rubber elastic body is made large by the inner recess, and the compression spring component of the main rubber elastic body is easy to obtain during input of a downward force from the first mounting member, making it possible to achieve a great degree of freedom in tuning the spring characteristics of the main rubber elastic body.

A second mode of the present invention provides the vibration damping device according to the first mode, wherein the inner recess has an inside face of a tapered shape inclining radially outward from a deepest part whose depth dimension is maximum toward opposite sides in an up-down direction of the inner recess.

According to the second mode, the up-down width dimension of the inner recess becomes larger toward the opening. Thus, the main rubber elastic body within the inner recess readily undergoes deformation during vibration input, thereby more advantageously dispersing the stress owing to the formation of the inner recess. Besides, the downward force may be efficiently transmitted from the inside face of the inner recess of the first mounting member to the main rubber elastic body, making it possible to effectively obtain the compression spring component of the main rubber elastic body. This allows the spring characteristics of the main rubber elastic body to be tuned with a large degree of freedom.

A third mode of the present invention provides the vibration damping device according to the second mode, wherein the deepest part of the inner recess has an inside face comprising a curved surface of a concave shape opening radially outward.

According to the third mode, the inside face of the deepest part of the inner recess comprises the curved surface. With this configuration, the inner recess is allowed to have a portion with a large depth dimension including the deepest part over a wide area in the up-down direction, thereby advantageously improving durability owing to the thick-walled main rubber elastic body. Moreover, the inside face of the inner recess has a shape without any corner at the deepest part, so that the main rubber elastic body may achieve improvement in durability or the like owing to dispersion of the stress at the portion bonded to the deepest part of the inner recess.

A fourth mode of the present invention provides the vibration damping device according to any one of the first through third modes, wherein the small-diameter portion of the main rubber elastic body has an outer circumferential surface comprising a concave curved surface of a concave shape opening radially outward, and the deepest part of the inner recess is positioned lower than a deepest part of the concave curved surface.

According to the fourth mode, since the outer circumferential surface of the main rubber elastic body has the concave curved surface, a free surface may be largely obtained in the outer circumferential surface of the main rubber elastic body, thereby improving durability of the main rubber elastic body. Besides, even if a cracking occurs by any possibility in the main rubber elastic body around the deepest part of the concave curved surface, extension of the cracking may be readily inhibited by the inside face of the inner recess, thereby enhancing reliability. In particular, with a fluid-filled vibration damping device, by preventing progression of the cracking from reaching the large-diameter portion of the main rubber elastic body that constitutes the wall part of the fluid-filled zone, leakage of the fluid can be avoided, thereby easily maintaining desired vibration damping ability.

A fifth mode of the present invention provides the vibration damping device according to any one of the first through fourth modes, wherein a lower face of the first mounting member is covered by the large-diameter portion of the main rubber elastic body.

According to the fifth mode, a free surface of the main rubber elastic body may be largely obtained, thereby improving durability of the main rubber elastic body. Moreover, for example, in the fluid-filled vibration damping device, by preventing the first mounting member from being exposed to the fluid-filled zone, corrosion of the first mounting member may be avoided, so as to improve durability.

A sixth mode of the present invention provides the vibration damping device according to any one of the first through fifth modes, wherein the inner recess is provided continuously about an entire circumference of the first mounting member.

According to the sixth mode, since the small-diameter portion of the main rubber elastic body is thick-walled about the entire circumference by the inner recess, the stress acting on the small-diameter portion of the main rubber elastic body may be moderated about the entire circumference, thereby more advantageously improving durability. In particular, by the inner recess being endowed with a cross-sectional shape that is generally constant in the circumferential direction, stress concentration can be prevented, so as to more advantageously ensure durability.

A seventh mode of the present invention provides the vibration damping device according to any one of the first through sixth modes, wherein the first mounting member further includes a projecting part projecting radially outward from an upper side than the inner recess.

According to the seventh mode, by the upper end portion of the main rubber elastic body being bonded to the projecting part, the bonding area of the main rubber elastic body to the first mounting member may be largely obtained. Besides, by a downward force being applied from the projecting part of the first mounting member to the upper end portion of the main rubber elastic body, the compression spring component becomes greater in the main rubber elastic body, thereby tuning the spring characteristics of the main rubber elastic body with a larger degree of freedom.

An eighth mode of the present invention provides the vibration damping device according to any one of the first through seventh modes, wherein the first mounting member further includes a slot-shaped recess provided axially below the inner recess and opening onto the outer circumferential surface of the first mounting member, the slot-shaped recess extending in a circumferential direction, and the main rubber elastic body connects opposed faces of an outer circumferential surface of the slot-shaped recess and an inner circumferential surface of the second mounting member.

According to the eighth mode, owing to the slot-shaped recess provided to the first mounting member, in the direction inclining with respect to the axial direction, it is possible to largely obtain a free length of the main rubber elastic body, thereby improving durability of the main rubber elastic body against input in the inclination direction. Moreover, since the slot-shaped recess is formed in the axially medial portion of the first mounting member, a projected area of the lower end face of the first mounting member in the axial direction can be largely obtained. Therefore, for example, the present mode may be applied to a fluid-filled vibration damping device in which a pressure-receiving chamber is formed on the lower side of the main rubber elastic body, the wall part of the pressure-receiving chamber is partially defined by the main rubber elastic body, and a non-compressible fluid is sealed therein. In this case, it is also possible to largely obtain pressure fluctuations in the pressure-receiving chamber with respect to input in the up-down direction or in the inclination direction.

A ninth mode of the present invention provides the vibration damping device according to any one of the first through eighth modes, further comprising a pressure-receiving chamber formed on an axially outer side of the large-diameter portion of the main rubber elastic body, a wall part of the pressure-receiving chamber being partially defined by the main rubber elastic body and the pressure-receiving chamber being filled with a non-compressible fluid such that pressure fluctuations arise therein during input of a vibration.

According to the ninth mode, by sufficiently obtaining the projected area of the first mounting member in the axial direction, an effective piston surface area or an expansion spring can be largely obtained, while avoiding deterioration in durability of the main rubber elastic body by moderating stress concentration. Moreover, by adopting the ninth mode in combination with the eighth mode, the projected area of the first mounting member in the axial direction may be sufficiently obtained while obtaining the effective free length of the main rubber elastic body greatly in the inclination direction, thereby improving durability of the main rubber elastic body against input in the inclination direction as well.

A tenth mode of the present invention provides the vibration damping device according to the ninth mode, wherein an axially lower end face of the first mounting member inserted from a small-diameter side end of the main rubber elastic body into an axial inside thereof comprises a flat part extending in an axis-perpendicular direction at a center portion of the axially lower end face, and an outer circumference of the flat part has an outer-circumference chamfered shape that smoothly curves and connects with the outer circumferential surface of the first mounting member.

According to the tenth mode, since the flat part is provided to the lower end face of the first mounting member, internal pressure in the pressure-receiving chamber may be efficiently fluctuated with respect to vibration input in the up-down direction, thereby advantageously obtaining vibration damping effect or the like owing to flow action of the fluid, for example. Furthermore, the outer circumference of the flat part has the outer-circumference chamfered shape that smoothly curves, and the lower end face and the outer circumferential surface of the first mounting member are smoothly connected in continuous fashion. This makes it possible to moderate stress concentration on the main rubber elastic body bonded to the connected portion of the lower end face and the outer circumferential surface of the first mounting member, so as to improve durability of the main rubber elastic body.

According to the present invention, the first mounting member includes the inner recess opening onto the outer circumferential surface thereof, and the small-diameter portion of the main rubber elastic body is bonded to the inner recess. Thus, the thickness dimension of the small-diameter portion, on which the stress is likely to be concentrated during elastic deformation of the main rubber elastic body, can be greatly obtained owing to the inner recess, thereby improving durability of the main rubber elastic body. Moreover, with the main rubber elastic body, the portion bonded to the inner recess projects radially outward with respect to the portion of the first mounting member situated on the lower side than the inner recess, so as to undergo elastic deformation with respect to the vibration input in the up-down direction. Consequently, when a downward force is input from the first mounting member, the compression spring component of the main rubber elastic body may be readily obtained, thereby attaining a great degree of freedom in tuning the spring characteristics of the main rubber elastic body.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein.

DETAILED DESCRIPTION OF EMBODIMENTS

Embodiments of the present invention will be described below in reference to the drawings.

Figure 1:
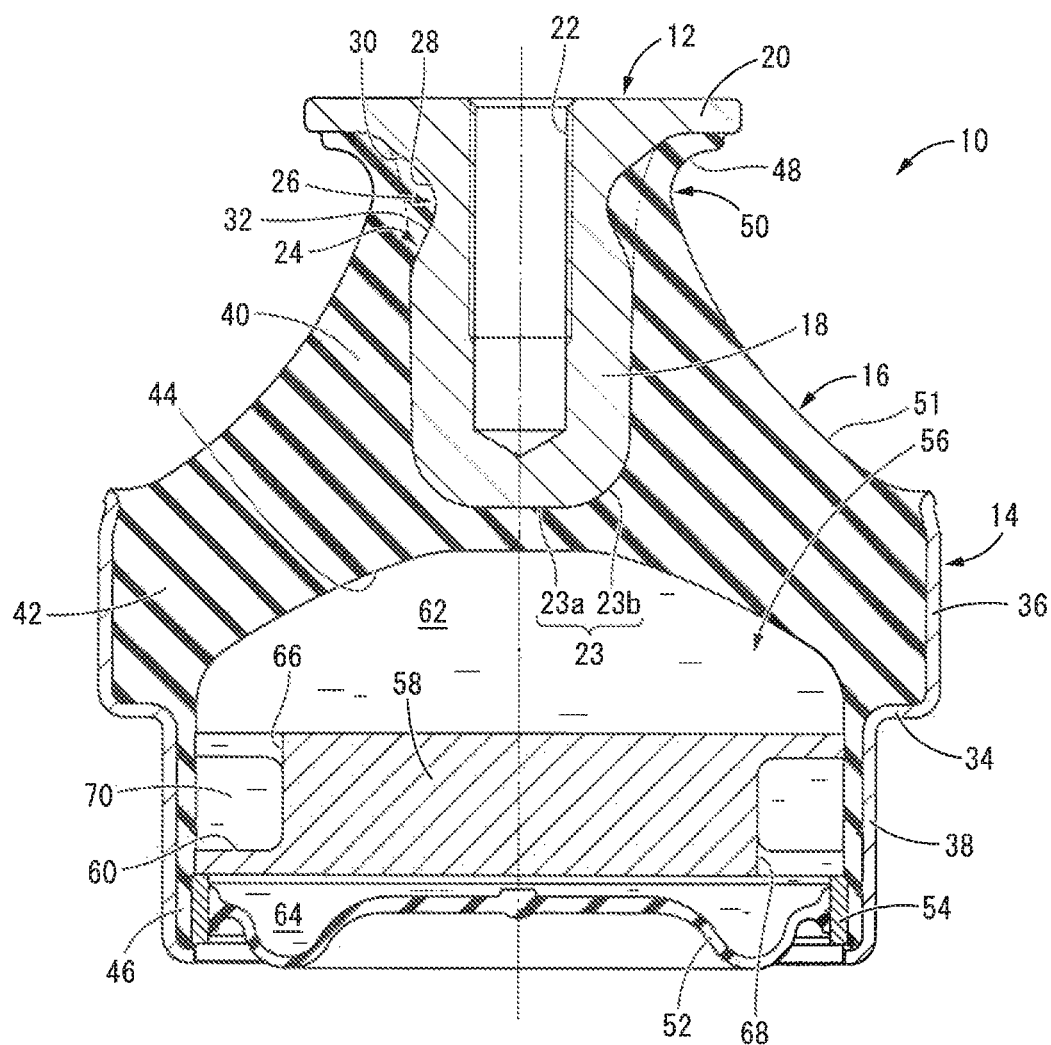
FIG. 1 is a longitudinal cross sectional view showing a vibration damping device in the form of an engine mount as a first embodiment of the present invention.

FIG. 1 depicts an automotive engine mount 10 as a first embodiment of the vibration damping device constructed according to the present invention. The engine mount 10 has a structure in which a first mounting member 12 and a second mounting member 14 are elastically connected to each other by a main rubber elastic body 16. In the description hereinbelow, the up-down direction refers to the up-down direction in FIG. 1, which coincides with the mount center axis direction, and which is also the direction of principal vibration input.

Described more specifically, the first mounting member 12 is a high rigidity component formed of metal or the like, and integrally includes a main body part 18 having a small-diameter, generally circular post shape, and a flanged part 20 serving as a projecting part that projects radially outward from the upper end of the main body part 18. The main body part 18 includes a screw hole 22 extending on the center axis in the up-down direction so as to open onto the upper face of the main body part 18. A lower end face 23 of the main body part 18 of the first mounting member 12 comprises a flat part 23a of generally circular shape extending in the axis-perpendicular direction at the center portion of the lower end face 23. Besides, the outer circumference of the flat part 23a comprises an annular curved part 23b having an outer-circumference chamfered shape that smoothly curves and connects with the outer circumferential surface of the main body part 18.

The main body part 18 of the first mounting member 12 includes an inner recess 24 opening onto the outer circumferential surface thereof. The inner recess 24 is formed in the upper portion of the main body part 18, and in the present embodiment, the inner recess 24 has a recessed groove shape provided continuously about the entire circumference of the main body part 18. Moreover, the inner recess 24, when viewed in the cross section in the axial direction (longitudinal cross section), has an inside face of a tapered shape such that a deepest part 26 whose depth dimension is maximum is positioned at the up-down medial portion, and the inside face inclines radially outward from the deepest part 26 toward the opposite sides in the up-down direction of the inner recess 24. Accordingly, the depth dimension of the inner recess 24 gradually decreases as it separates from the deepest part 26 in the up-down direction. The deepest part 26 refers to the point that is closest to the mount center axis (the dot-and-dash line in FIG. 1) in the axis-perpendicular direction in the inside face of the inner recess 24.

More specifically, the inside face of the inner recess 24 of the present embodiment is configured such that the up-down medial portion including the deepest part 26 comprises a curved surface 28 of generally arcuate shape when viewed in longitudinal cross section, while tapered surfaces 30, 32 extending in the direction of a tangent of the arcuate curved surface 28 is provided so as to be continuous with the upper and lower opposite ends of the arcuate curved surface 28. Moreover, the upper tapered surface 30 inclines radially outward to the upper side with its upper end smoothly connected to the lower face of the flanged part 20, while the lower tapered surface 32 inclines radially outward to the lower side with its lower end smoothly connected to the outer circumferential surface of the main body part 18 away from the inner recess 24. As will be understood from the above description, the flanged part 20 is provided on the upper side than the inner recess 24.

Furthermore, it is desirable that the inner recess 24 of the present embodiment have a maximum width dimension in the up-down direction that is ¼ to ½ of the up-down dimension of the main body part 18 of the first mounting member 12. Moreover, with the inner recess 24, the deepest part 26 is preferably positioned on the upper side than the up-down center of the main body part 18. Additionally, the inner recess 24 has a radial depth made smaller than its up-down width, and the ratio of the maximum radial depth to the maximum up-down width is preferably ½ to ¼.

Besides, it is desirable that the upper tapered surface 30 constituting the inside face of the inner recess 24 have an inclination angle of 20° to 70° with respect to the up-down direction. Meanwhile, it is desirable that the lower tapered surface 32 constituting the inside face of the inner recess 24 have an inclination angle of 20° to 70° with respect to the up-down direction, and in the present embodiment, the lower tapered surface 32 inclines at roughly the same angle with the corresponding outer circumferential surface of the main rubber elastic body 16. In the present embodiment, the upper and lower tapered surfaces 30, 32 extends roughly straightly when viewed in longitudinal cross section, so that the inclination angle with respect to the up-down direction is generally constant over the entirety. However, for example, the upper and lower tapered surfaces 30, 32 may have a curved surface so that the inclination angle with respect to the up-down direction changes.

The second mounting member 14 is formed of metal or the like, similar to the first mounting member 12, and has a thin-walled, large-diameter, generally round tubular shape. The second mounting member 14 includes at its up-down medial portion a step part 34, and thereby being provided with a large-diameter tube part 36 on the upper side of the step part 34 and a small-diameter tube part 38 on the lower side of the step part 34.

Then, the first mounting member 12 and the second mounting member 14 are arranged roughly on the same center axis, and elastically connected to each other by the main rubber elastic body 16. The main rubber elastic body 16 has a generally frustoconical shape with its upper portion serving as a small-diameter portion 40, and its lower portion serving as a large-diameter portion 42. The surface of the main body part 18 and the lower face of the flanged part 20 of the first mounting member 12 is bonded by vulcanization to the small-diameter portion 40 of the main rubber elastic body 16, while the inner circumferential surface of the second mounting member 14 is bonded by vulcanization to the outer circumferential surface of the large-diameter portion 42 of the main rubber elastic body 16. Thus, the main rubber elastic body 16 of the present embodiment takes the form of an integrally vulcanization molded component including the first mounting member 12 and the second mounting member 14.

With the main rubber elastic body 16, the portion to which the second mounting member 14 is bonded serves as the large-diameter portion 42 including the large-diameter side end thereof, and the portion which is positioned on the upper side of the large-diameter portion 42 and made smaller in diameter serves as the small-diameter portion 40 including the small-diameter side end thereof. In the present embodiment, in the cross-sectional shape in the axial direction, the small-diameter portion 40 has a generally frustoconical shape, while the large-diameter portion 42 has a generally circular post shape. It would be acceptable as long as the first mounting member 12 is bonded at least to the small-diameter portion 40, and with respect to the large-diameter portion 42, it is acceptable for the first mounting member 12 either to be bonded or not to be bonded.

In the present embodiment, the first mounting member 12 is inserted from the small-diameter end face (upper face) of the main rubber elastic body 16 toward the large-diameter side end (lower end) thereof, so that the outer circumferential surface of the main body part 18 is disposed so as to be embedded in the main rubber elastic body 16. In particular, the first mounting member 12 has an axial length that is not smaller than ⅗ of the entire axial length of the main rubber elastic body 16, and reaches as far as the large-diameter portion 42 of the main rubber elastic body 16 to which the second mounting member 14 is bonded. Specifically, in the present embodiment, the distal end (lower end) of the first mounting member 12 is disposed at the location that overlaps the bonding face of the second mounting member 14 to the main rubber elastic body 16 as viewed in the axis-perpendicular direction.

Moreover, the large-diameter portion 42 of the main rubber elastic body 16 includes a recess 44 opening onto the lower face. The recess 44 has a generally bowl shape and becomes larger in diameter downwardly, toward the opening side. Besides, a thin-walled, large diameter seal rubber layer 46 is integrally formed so as to extend downward from the opening edge portion of the recess 44 of the main rubber elastic body 16, and is bonded to the inner circumferential surface of the small-diameter tube part 38 of the second mounting member 14. The lower face of the main body part 18 of the first mounting member 12 is covered by the large-diameter portion 42 of the main rubber elastic body 16 that constitutes the upper base wall of the recess 44.

The upper portion of the small-diameter portion 40 of the main rubber elastic body 16 is bonded to the inside face of the inner recess 24. The small-diameter portion 40 of the main rubber elastic body 16 is configured such that its inner circumferential portion is arranged so as to fill the entire inner recess 24 and be bonded by vulcanization to the inside face of the inner recess 24, while its outer circumferential surface is positioned radially outward further than the opening of the inner recess 24 (the chain double-dashed line in FIG. 1). Also, the main rubber elastic body 16 has the outside diameter dimension made larger at the small-diameter portion 40 bonded to the inner recess 24 than the outside diameter dimension of the main body part 18 of the first mounting member 12 at the lower side portion than the inner recess 24, and the small-diameter portion 40 becomes gradually larger in outside diameter downwardly beyond the inner recess 24. The small-diameter portion 40 of the main rubber elastic body 16 has the outer circumferential surface including a concave curved surface 48 of a concave shape opening radially outward. The concave curved surface 48 is configured such that a deepest part 50 whose radial depth dimension is maximum is positioned radially outward away from the lower edge portion of the opening of the inner recess 24, which is the lower side portion than the inner recess 24 of the first mounting member 12, as viewed in the axial direction. The concave curved surface 48 curves so as to incline radially outward from the deepest part 50 toward the opposite sides in the up-down direction, and the lower side portion of the deepest part 50 constitutes a tapered outer circumferential surface 51 inclining to the radial outside downwardly. Besides, the deepest part 50 refers to the point that is closest to the mount center axis (the dot-and-dash line in FIG. 1) in the axis-perpendicular direction in the inside face of the concave curved surface 48.

In this way, the upper portion of the small-diameter portion 40 of the main rubber elastic body 16 is bonded to the inside face of the inner recess 24, so as to be radially thick-walled at the portion where the inner recess 24 is formed. In the present embodiment, since the inner recess 24 is provided continuously about the entire circumference, the small-diameter portion 40 of the main rubber elastic body 16 is thick-walled about the entire circumference due to the inner recess 24. Besides, the deepest part 26 of the inner recess 24 is positioned within the opening area of the concave curved surface 48 of the main rubber elastic body 16, and is positioned lower than the deepest part 50 of the concave curved surface 48.

Moreover, the upper end of the small-diameter portion 40 of the main rubber elastic body 16 is bonded to the lower face of the flanged part 20 of the first mounting member 12. The small-diameter portion 40 of the main rubber elastic body 16 is bonded at its upper side than the concave curved surface 48 to the flanged part 20 of the first mounting member 12. Furthermore, the upper end of the small-diameter portion 40 bonded to the lower face of the flanged part 20 becomes larger in diameter upwardly at the upper side of the deepest part 50.

Besides, a flexible film 52 is attached to the second mounting member 14 bonded to the main rubber elastic body 16. The flexible film 52 is a thin-walled rubber film that is allowed to undergo flexural deformation as well as extensional and contractive deformation. Also, the flexible film 52 has a generally circular disk shape overall, and its outer peripheral portion is made even thinner than its radially inner portion, so as to have an ample slack.

Additionally, to the outer peripheral surface of the flexible film 52, an annular or tubular fixing member 54 is bonded. The fixing member 54 is formed of metal or the like, and is fixed to the small-diameter tube part 38 of the second mounting member 14 covered by the seal rubber layer 46. In the present embodiment, after the fixing member 54 is inserted into the small-diameter tube part 38 of the second mounting member 14, the outer circumferential surface of the fixing member 54 is pressed against the inner circumferential surface of the small-diameter tube part 38 of the second mounting member 14 via the seal rubber layer 46 by the second mounting member 14 being subjected to a diameter reduction process such as 360-degree radial compression, so that the fixing member 54 is fixed to the second mounting member 14. Moreover, by the lower end of the small-diameter tube part 38 of the second mounting member 14 being bent radially inward during the diameter constriction, downward dislodgment of the fixing member 54 is prevented.

By the flexible film 52 being attached to the second mounting member 14 in this way, a fluid-filled zone 56 isolated from the outside is formed between the axially opposite main rubber elastic body 16 and flexible film 52, and is filled with a non-compressible fluid. The non-compressible fluid sealed in the fluid-filled zone 56 is not limited to a particular fluid. For example, preferably adopted as the fluid is a liquid such as water, ethylene glycol, alkylene glycol, polyalkylene glycol, silicone oil, or a mixture liquid of them. More preferably, a low-viscosity fluid having viscosity of 0.1 Pa·s or lower is adopted.

In the present embodiment, the lower face of the main body part 18 of the first mounting member 12 is covered by the large-diameter portion 42 of the main rubber elastic body 16. Accordingly, the upper base wall face of the fluid-filled zone 56 is constituted by the main rubber elastic body 16 roughly entirely so that the main body part 18 of the first mounting member 12 is not exposed. This configuration prevents corrosion of the first mounting member 12 due to the fluid filled in the fluid-filled zone 56, thereby improving durability of the first mounting member 12.

Moreover, a partition member 58 is disposed within the fluid-filled zone 56. The partition member 58 is made of metal or rigid synthetic resin, and has a generally circular disk shape overall. Besides, the outer peripheral end of the partition member 58 includes a circumferential groove 60 that opens onto the outer peripheral surface thereof while extending in the circumferential direction for a length less than once around the circumference.

The partition member 58 is inserted in the radial inside of the small-diameter tube part 38 of the second mounting member 14 and arranged so as to extend in the roughly axis-perpendicular direction within the fluid-filled zone 56. Then, the partition member 58 is fixed to the second mounting member 14 by its outer circumferential surface being pressed against the inner circumferential surface of the small-diameter tube part 38 via the seal rubber layer 46. Similar to the fixing member 54 of the flexible film 52, the partition member 58 is fixed to the second mounting member 14 through a diameter reduction process of the second mounting member 14, for example.

Furthermore, the partition member 58 bifurcates the fluid-filled zone 56 in the up-down direction, so that the upper side of the partition member 58 in the fluid-filled zone 56 serves as a pressure-receiving chamber 62 with its wall part partially defined by the main rubber elastic body 16, and the lower side of the partition member 58 in the fluid-filled zone 56 serves as an equilibrium chamber 64 with its wall part partially defined by the flexible film 52. The pressure-receiving chamber 62 and the equilibrium chamber 64 are filled with the non-compressible fluid described above. The pressure-receiving chamber 62 is formed on the axially outer side (lower side) of the large-diameter portion 42 of the main rubber elastic body 16.

In addition, the outer peripheral opening of the circumferential groove 60 provided to the partition member 58 is covered fluid-tightly by the second mounting member 14 via the seal rubber layer 46, so as to form a tunnel-like passage extending in the circumferential direction. While one end of the tunnel-like passage communicates with the pressure-receiving chamber 62 through an upper communication aperture 66, the other end of the tunnel-like passage communicates with the equilibrium chamber 64 through a lower communication aperture 68. This configuration provides an orifice passage 70 that interconnects the pressure-receiving chamber 62 and the equilibrium chamber 64. With the orifice passage 70 of the present embodiment, by adjusting the ratio between the passage cross sectional area and the passage length, the tuning frequency, which is the resonance frequency of the flowing fluid, is set to a low frequency on the order of 10 Hz, which corresponds to an engine shake. However, the tuning frequency of the orifice passage 70 is not limited in particular.

The engine mount 10 of the above construction is mounted onto the vehicle by, for example, the first mounting member 12 being attached to a power unit (not shown), and the second mounting member 14 being attached to a vehicle body (not shown either). With the engine mount 10 mounted onto the vehicle, when vibration in the up-down direction is input, vibration damping effect such as vibration attenuating action will be exhibited by elastic deformation of the main rubber elastic body 16, while fluid flow will take place through the orifice passage 70 based on relative pressure fluctuations of the pressure-receiving chamber 62 and the equilibrium chamber 64, thereby achieving vibration damping effect based on the flow action of the fluid.

In the present embodiment, since the lower end face 23 of the first mounting member 12 includes the flat part 23a, excellent vibration damping ability may be exhibited owing to improvement in piston efficiency. Moreover, the outer circumferential side of the flat part 23a comprises the curved part 23b, thereby avoiding stress concentration on the main rubber elastic body 16 at the connection portion of the lower end face 23 and the outer circumferential surface of the first mounting member 12.

Here, the upper portion of the small-diameter portion 40 of the main rubber elastic body 16, on which stress is likely to be concentrated during vibration input in the up-down direction, is thick-walled by the inner recess 24. This may moderate the stress concentration on the upper portion of the small-diameter portion 40 of the main rubber elastic body 16, thereby improving durability of the main rubber elastic body 16.

In the present embodiment in particular, the deepest part 50 of the concave curved surface 48 is positioned radially outside of the inner recess 24. Accordingly, at the deepest part 50 of the concave curved surface 48, which is likely to be thin-walled, the small-diameter portion 40 may be thick-walled by the inner recess 24. In this way, the portion that is especially thin-walled and likely to be subject to stress concentration in the small-diameter portion 40 of the main rubber elastic body 16 is made thick-walled by the inner recess 24. Thus, improvement in durability of the small-diameter portion 40 may be more advantageously achieved.

Besides, the outer circumferential surface of the main rubber elastic body 16 at the portion located on the radially outside of the inner recess 24 is positioned radially outward further than the outer circumferential surface of the main body part 18 on the lower side than the inner recess 24. With this configuration, the portion of the main rubber elastic body 16 positioned radially outward further than the opening of the inner recess 24 is less prone to be restrained by the inside face of the inner recess 24 during vibration input in the up-down direction, and is allowed to undergo elastic deformation. As a result, the downward input from the first mounting member 12 will be efficiently transmitted to the main rubber elastic body 16. Thus, it is possible to largely obtain the compression spring component in the up-down direction of the main rubber elastic body 16, thereby tuning the spring characteristics with a great degree of freedom.

Moreover, in the present embodiment, the inside face of the inner recess 24 includes the upper and lower tapered surfaces 30, 32 inclining radially outward from the deepest part 26 toward the axially opposite sides. Therefore, owing to the upper tapered surface 30, the downward force will be readily exerted from the first mounting member 12 to the main rubber elastic body 16, while the downward force exerted from the inside face of the inner recess 24 to the main rubber elastic body 16 will be efficiently transmitted to the large-diameter portion 42 of the main rubber elastic body 16 without being hampered by the lower tapered surface 32. In this way, the main rubber elastic body 16 arranged on the radially outside of the inner recess 24 is configured to deform during vibration input in the up-down direction. Thus, the substantial rubber volume of the small-diameter portion 40 of the main rubber elastic body 16 is greatly obtained by the inner recess 24, thereby effectively improving durability of the small-diameter portion 40.

In the present embodiment in particular, the flanged part 20 projecting radially outward is provided to the upper end of the first mounting member 12, and the upper end of the main rubber elastic body 16 is bonded to the lower face of the flanged part 20. With this configuration, the downward force is more advantageously exerted from the first mounting member 12 to the main rubber elastic body 16. Besides, the bonding area of the upper end of the main rubber elastic body 16 to the first mounting member 12 is largely ensured, making it possible to obtain great adherence strength of the first mounting member 12 and the main rubber elastic body 16 as well.

Furthermore, the inside face around the deepest part 26 of the inner recess 24 comprises the arcuate curved surface 28 of a concave shape opening radially outward in longitudinal cross section. This moderates the stress concentration on the portion of the main rubber elastic body 16 bonded to the deepest part 26 of the inner recess 24. Also, in the inner recess 24, the area having a large depth dimension including the deepest part 26 is set with a certain degree of up-down width owing to the arcuate curved surface 28. Accordingly, the small-diameter portion 40 of the main rubber elastic body 16 is thick-walled over a wide area in the up-down direction due to the inner recess 24.

Additionally, since the inner recess 24 has an annular shape that is continuous about the entire circumference, the small-diameter portion 40 of the main rubber elastic body 16 is thick-walled about the entire circumference by the inner recess 24, thereby more effectively improving durability of the main rubber elastic body 16 through dispersion of the stress. Moreover, in the present embodiment, the inner recess 24 has a cross-sectional shape that is generally constant about the entire circumference, so as to avoid stress concentration caused by change in cross-sectional shape of the inner recess 24. This may more advantageously improve durability of the main rubber elastic body 16.

Besides, the outer circumferential surface of the small-diameter portion 40 of the main rubber elastic body 16 includes the concave curved surface 48 of a concave shape opening radially outward, and the deepest part 26 of the inner recess 24 is positioned lower than the deepest part 50 that is positioned at the radially innermost part of the concave curved surface 48. With this configuration, even if a cracking occurs in the small-diameter portion 40 of the main rubber elastic body 16 near the deepest part 50 of the concave curved surface 48, the extension of the cracking will be inhibited by the inside face of the inner recess 24, making it difficult for the cracking to reach the large-diameter portion 42 of the main rubber elastic body 16.

Moreover, distortion or stress due to compression of the main rubber elastic body 16 is likely to occur more largely on the lower side of the deepest part 50 of the concave curved surface 48, which is the side on which the main rubber elastic body 16 exists, than on the upper side of the deepest part 50. Therefore, by positioning the deepest part 26 of the inner recess 24 below the deepest part 50 of the concave curved surface 48 and setting the rubber thickness large at the site where distortion or stress largely occurs, it is possible to reduce the distortion or stress.

In addition, the lower end face 23 of the main body part 18 of the first mounting member 12 is covered by the main rubber elastic body 16, and the upper base wall face of the pressure-receiving chamber 62 is defined by the main rubber elastic body 16 over its entirety. Thus, a free surface of the main rubber elastic body 16 is largely ensured in the wall face of the pressure-receiving chamber 62, thereby improving durability of the main rubber elastic body 16.

Figure 2:
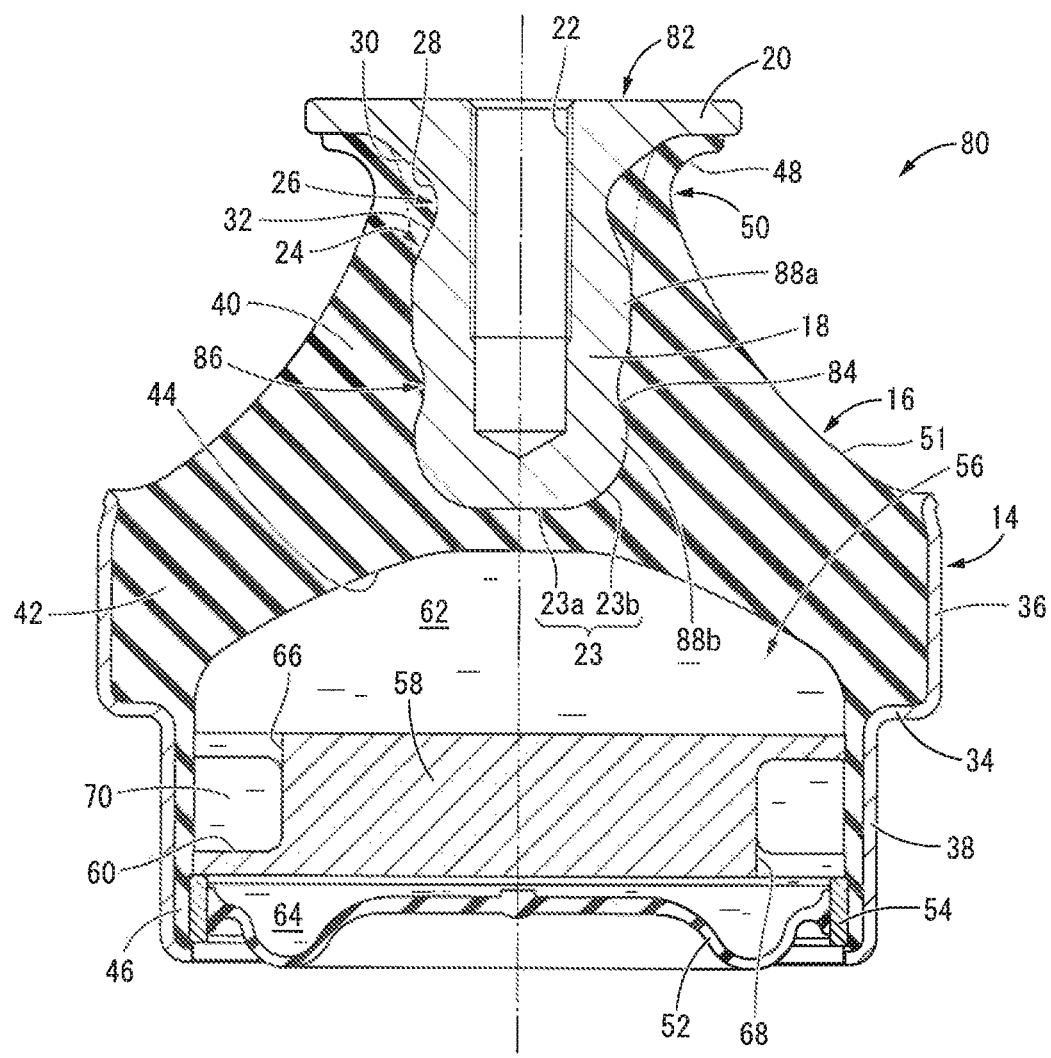
FIG. 2 is a longitudinal cross section view showing an engine mount as a second embodiment of the present invention.

FIG. 2 depicts an automotive engine mount 80 as a second embodiment according to the present invention. The engine mount 80 has a structure in which a first mounting member 82 and a second mounting member 14 are elastically connected by a main rubber elastic body 16. In the description hereinbelow, components and parts that are substantially identical with those in the first embodiment will be assigned like symbols and not described in any detail.

Figure 3:
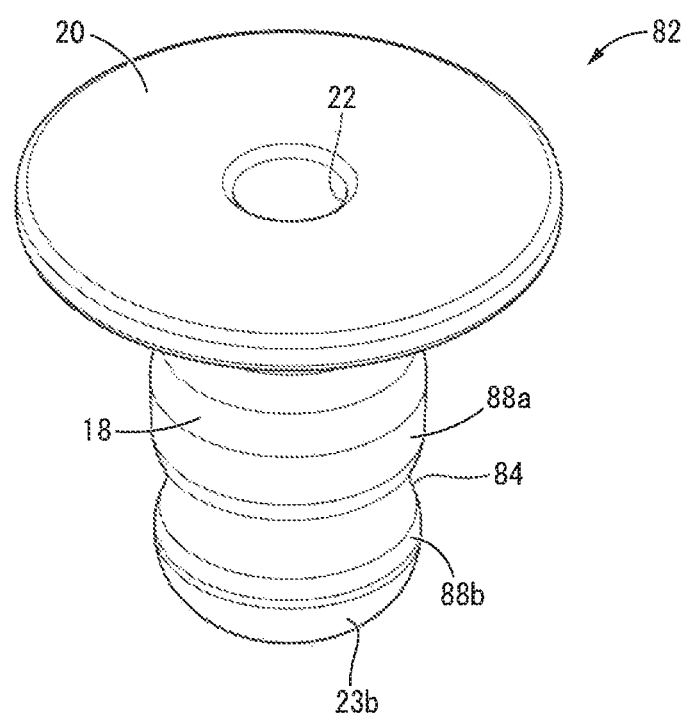
FIG. 3 is a perspective view of a first mounting member constituting the engine mount shown in FIG. 2.

Described more specifically, as depicted in FIG. 3, the first mounting member 82 includes a slot-shaped recess 84 in the axially medial portion of the main body part 18. The slot-shaped recess 84 is provided axially below the inner recess 24 and opens onto the outer circumferential surface of the main body part 18 while extending in the circumferential direction. In the present embodiment, the slot-shaped recess 84 extends continuously with a generally constant cross-sectional shape about the entire circumference.

Moreover, in the cross-sectional shape in the axial direction, the slot-shaped recess 84 has a curved shape in which its roughly entire outer circumferential surface (recess part inside face) smoothly curves. Besides, with the slot-shaped recess 84 of the present embodiment, the radial depth dimension of the deepest part 86 is made smaller than the depth dimension of the deepest part 26 of the inner recess 24, for example, not greater than ½ of the depth dimension of the inner recess 24.

On the axially opposite sides of the slot-shaped recess 84, outer circumferential protrusions 88a, 88b are provided. Each of the outer circumferential protrusions 88a, 88b is larger in diameter than the portion where the slot-shaped recess 84 is formed in the first mounting member 82. The upper outer circumferential protrusion 88a is provided between the inner recess 24 and the slot-shaped recess 84, while the lower outer circumferential protrusion 88b is provided below the slot-shaped recess 84.

Furthermore, the outer circumferential surface of the slot-shaped recess 84 and the outer circumferential surfaces of the outer circumferential protrusions 88a, 88b constitute a wave shape by smoothly curving and connecting with one another in the axial direction. Besides, the outer circumferential surface (inside face) of the inner recess 24 and the outer circumferential surface of the upper outer circumferential protrusion 88a also constitute a wave shape by smoothly curving and connecting with each another in the axial direction. Accordingly, the entire outer circumferential surface of the main body part 18 of the first mounting member 82 has a smooth face shape without any break points or broken lines.

Then, similar to the first mounting member 12 of the first embodiment, the first mounting member 82 of the present embodiment is bonded by vulcanization to the main rubber elastic body 16 in a state of being inserted downwardly from the upper end face of the main rubber elastic body 16, which is the small-diameter end face thereof.

Besides, the deepest part 86 of the slot-shaped recess 84, whose radial depth dimension is maximum, is positioned away to the axially upper side from the bonding face of the large-diameter portion 42 of the main rubber elastic body 16 bonded to the inner circumferential surface of the second mounting member 14. In the present embodiment, the entire slot-shaped recess 84 is positioned away to the axially upper side from the large-diameter portion 42, and the small-diameter portion 40 of the main rubber elastic body 16 is bonded to the outer circumferential surface of the slot-shaped recess 84.

Additionally, the main rubber elastic body 16 of solid structure connects opposed faces of the outer circumferential surface of the slot-shaped recess 84 and the inner circumferential surface of the second mounting member 14 in the same inclination direction as that of the tapered outer circumferential surface 51, which is the lower portion of the concave curved surface 48 of the main rubber elastic body 16. That is, in the present embodiment, the slot-shaped recess 84 is filled with the main rubber elastic body 16, and the main rubber elastic body 16 continuously connects the opposed faces of the outer circumferential surface of the slot-shaped recess 84 and the inner circumferential surface of the second mounting member 14 in the direction of inclination to the radial outside downwardly. Thus, there is not formed any void, liquid chamber or the like between the opposed faces of the outer circumferential surface of the slot-shaped recess 84 and the inner circumferential surface of the second mounting member 14 in the inclination direction. It is acceptable as long as the main rubber elastic body 16 connecting the outer circumferential surface of the slot-shaped recess 84 and the inner circumferential surface of the second mounting member 14 extends continuously in the same inclination direction as that of the tapered outer circumferential surface 51, and the inclination angle thereof is not limited in particular.

With the engine mount 80 constructed according to the present embodiment, owing to the slot-shaped recess 84 formed in the main body part 18 of the first mounting member 82, the free length of the main rubber elastic body 16 is made large in the inclination direction that connects the outer circumferential surface of the slot-shaped recess 84 and the inner circumferential surface of the second mounting member 14. With this configuration, for example, during input in the direction inclined with respect to the axial direction, stress acting on the main rubber elastic body 16 may be dispersed, thereby improving durability of the main rubber elastic body 16. In the present embodiment in particular, since improvement in durability of the main rubber elastic body 16 with respect to input in the axial direction is attained by the inner recess 24, the first mounting member 82 including both of the inner recess 24 and the slot-shaped recess 84 is able to contribute to excellent durability with respect to inputs in both the axial direction and the direction inclined with respect to the axial direction.

Moreover, the outer circumferential protrusions 88a, 88b are provided on the axially opposite sides of the slot-shaped recess 84, thereby decreasing influence on vibration damping characteristics in the up-down direction due to formation of the slot-shaped recess 84. Specifically, owing to the lower outer circumferential protrusion 88b, the area of the lower end face 23 of the first mounting member 82 is largely obtained. By so doing, during vibration input in the up-down direction, the force will be efficiently exerted from the lower end face 23 to the pressure-receiving chamber 62, so as to efficiently induce internal pressure fluctuations within the pressure-receiving chamber 62, thereby effectively achieving vibration damping effect based on flow action of the fluid. Besides, during vibration input in the up-down direction, the upper outer circumferential protrusion 88a will prevent the main rubber elastic body 16 within the slot-shaped recess 84 from deforming so as to escape to the upper side. This will inhibit deterioration in expansion spring of the pressure-receiving chamber 62 due to formation of the slot-shaped recess 84, so that pump effect of the pressure-receiving chamber 62 can be sufficiently attained, thereby effectively obtaining vibration damping effect based on flow action of the fluid.

Furthermore, the outer circumferential surface of the slot-shaped recess 84 and the outer circumferential surfaces of the outer circumferential protrusions 88a, 88b are smoothly continuous with one another in the axial direction. This may disperse stress in the main rubber elastic body 16, thereby further improving durability. In the present embodiment in particular, the entire outer circumferential surface of the main body part 18 of the first mounting member 82, which is inserted into and bonded to the main rubber elastic body 16 in the axial direction, has a wavy form that smoothly continues in the axial direction. Thus, stress concentration on the main rubber elastic body 16 due to formation of the inner recess 24 or the slot-shaped recess 84 will be moderated, thereby sufficiently ensuring durability of the main rubber elastic body 16.

Meanwhile, with respect to the engine mount constructed according to the second embodiment (Example) and an engine mount devoid of the slot-shaped recess on the outer circumferential surface of the first mounting member (Comparative Example), simulation was performed on distribution of distortion occurred to the main rubber elastic body with respect to input in the inclination direction. In comparison with Comparative Example devoid of the slot-shaped recess, in Example provided with the slot-shaped recess, the distortion was dispersed to the axially opposite sides of the portion bonded to the slot-shaped recess. Accordingly, the distortion was reduced at the portion bonded to the slot-shaped recess provided to the axially center portion of the first mounting member. In this way, the effect of the present invention has been demonstrated by the simulation as well, namely, the slot-shaped recess will disperse and reduce the distortion occurred to the main rubber elastic body during input in the inclination direction.

While the present invention has been described in detail hereinabove in terms of the embodiments, the invention is not limited by the specific disclosures thereof. For example, the outer circumferential surface of the small-diameter portion 40 of the main rubber elastic body 16 may have a tapered shape becoming smaller in diameter upward over its entirety, and need not constitute the concave curved surface 48. Meanwhile, in the case in which the outer circumferential surface of the small-diameter portion 40 includes the concave curved surface 48, the deepest part 50 of the concave curved surface 48 may be arranged at the roughly same position in the up-down direction as that of the deepest part 26 of the inner recess 24, or may alternatively be arranged below the deepest part 26 of the inner recess 24.

Besides, the shape of the inner recess may suitably be changed. As a specific example, in the preceding embodiments, the inside face of the inner recess 24 is configured such that the arcuate curved surface 28 is set around the deepest part 26, and the tapered surfaces 30, 32 are respectively provided to the upper and lower opposite sides of the arcuate curved surface 28 in continuous fashion. However, the entire inside face of the inner recess may be constituted by an arcuate curved surface.

Moreover, the inner recess is not necessarily an annulus that continues about the entire circumference of the first mounting member, but may be, for example, a C-shaped slot that continues in the circumferential direction for a length less than once around the circumference, a slot that straightly extends in one diametrical direction, or a spot-like concave.

The outer circumferential surface of the main body part 18 of the first mounting member 12 may have a tapered shape becoming smaller in diameter downward, for example. This makes it possible to advantageously obtain the compression spring component of the main rubber elastic body 16 between the main body part 18 of the first mounting member 12 and the second mounting member 14. Also, the projecting part of the first mounting member 12 is not limited to the flange-shaped one provided all the way around the circumference such as the flanged part 20 of the preceding embodiments, but may be provided partially in the circumferential direction, or may be dispensed with, for example. In the case in which the projecting part is dispensed with, the entire outer circumferential surface of the first mounting member 12 may have a tapered shape, for example.

Additionally, the lower end face 23 of the main body part 18 need not include the flat part 23a, but may be entirely constituted by a curved surface sloping upward radially outward such as the curved part 23b, for example.

Figure 4:
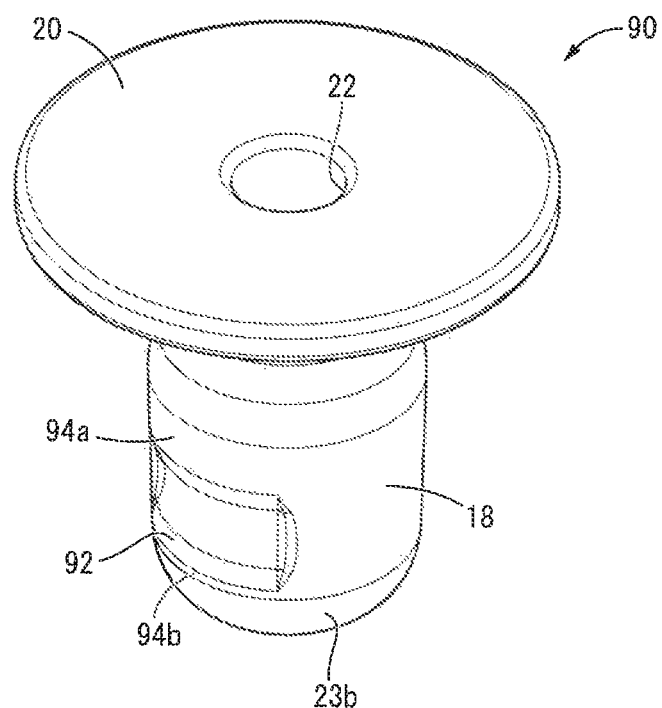
FIG. 4 is a perspective view of a first mounting member constituting an engine mount as another embodiment of the present invention.
Figure 5:
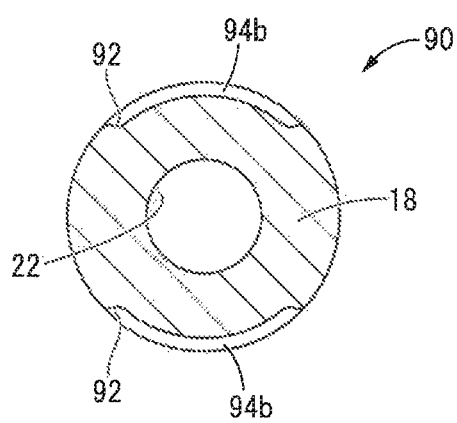
FIG. 5 is a transverse cross sectional view of the first mounting member shown in FIG. 4.

Whereas the second embodiment exemplified the slot-shaped recess 84 continuously extending about the entire circumference, it would also be possible to adopt, as shown by a first mounting member 90 in FIGS. 4 and 5, a slot-shaped recess 92 provided partially in the circumferential direction, for example. In the embodiment according to FIGS. 4 and 5, a pair of the slot-shaped recesses 92, 92 are provided at the positions that are opposed to each other in one diametrical direction (the up-down direction in FIG. 5), so that in the formation portions of the pair of the slot-shaped recesses 92, 92, the free length of the main rubber elastic body 16 is greatly ensured. This makes it possible to adjust the spring characteristics in two diametrical directions that are perpendicular to each other so as to be mutually different by presence or absence of the slot-shaped recess 92, for example, thereby obtaining the required spring ratio or the like.

With the first mounting member 90 shown in FIGS. 4 and 5, the slot-shaped recesses 92, 92 are provided at the two circumferential locations. Thus, outer circumferential protrusions 94a, 94b are provided to the axially opposite sides of each of the slot-shaped recesses 92, 92, and the outer circumferential protrusions 94a, 94b are also provided partially in the circumferential direction. Besides, the outer circumferential surface of the slot-shaped recess 92 is connected with the opposite outer circumferential surfaces of the main body part 18 that are off the slot-shaped recess 92 in the circumferential direction and with the opposite outer circumferential surfaces of the main body part 18 that are off the slot-shaped recess 92 in the axial direction, by a smooth surface without any break points or broken lines, for each outer circumferential surface.

Furthermore, while the slot-shaped recess 84 of the second embodiment extends with a generally constant cross-sectional shape in the circumferential direction, it is also possible for the cross-sectional shape to vary in the circumferential direction. For example, with the pair of slot-shaped recesses 92, 92 shown in FIGS. 4 and 5, the axial dimension or the depth dimension may become gradually smaller toward the circumferentially opposite ends. In addition, in the second embodiment, the slot-shaped recess 84 has a concave shape that is shallower than the inner recess 24, but may also adopt a slot-shaped recess having a concave shape that is deeper than the inner recess 24. Besides, with the slot-shaped recess 84, the axial dimension of the opening part or the inclination angle of the outer circumferential surfaces on the axially opposite sides with respect to the deepest part 86 may suitably be changed.

Moreover, it would also be acceptable to provide three or more slot-shaped recesses of circumferentially partial shape at the locations that are remote from one another in the circumferential direction along the same given circumference. Also, a plurality of slot-shaped recess may be provided in parallel so as to be side by side in the axial direction.

The present invention is not limited to implementation in fluid-filled vibration damping devices only, and may be implemented in vibration damping devices of solid type devoid of the fluid-filled zone 56. Additionally, the invention may be implemented in tubular vibration-damping devices in which a first mounting member and a second mounting member are coaxially arranged and elastically connected by a main rubber elastic body in the radial direction.

What is claimed is:

1. A vibration damping device comprising:
   a first mounting member;
   a second mounting member; and
   a main rubber elastic body elastically connecting the first and second mounting members, an upper portion of the main rubber elastic body serving as a small-diameter portion to which the first mounting member is bonded, and a lower portion of the main rubber elastic body serving as a large-diameter portion to which the second mounting member is bonded, wherein:
   the first mounting member includes:
      an inner recess opening onto an outer circumferential surface thereof, and
      a flanged part above the inner recess in an axial direction of the vibration damping device,
   the small-diameter portion of the main rubber elastic body is bonded to the inner recess,
   the main rubber elastic body has an outside diameter dimension made larger at a portion bonded to the inner recess than an outside diameter dimension of the first mounting member at a side lower than the inner recess such that the small-diameter portion of the main rubber elastic body is thick-walled by being bonded to the inner recess,
   the main rubber elastic body directly connects opposed faces of an outer circumferential surface of the inner recess and an inner circumferential surface of the second mounting member,
   the inner recess includes a deepest part having a maximum depth dimension, and the deepest part includes a curved surface of a concave shape opening radially outward,
   the inner recess includes a tapered face inclining radially outward from the deepest part toward opposite sides in the axial direction of the vibration damping device,
   the deepest part of the inner recess forms a smallest outer diameter of the first mounting member, and
   the flanged part forms a largest outer diameter of the first mounting member.

2. The vibration damping device according to claim 1, wherein a lower face of the first mounting member is covered by the large-diameter portion of the main rubber elastic body.

3. The vibration damping device according to claim 1, wherein the inner recess is provided continuously about an entire circumference of the first mounting member.

4. A vibration damping device comprising:
   a first mounting member;
   a second mounting member; and
   a main rubber elastic body elastically connecting the first and second mounting members, an upper portion of the main rubber elastic body serving as a small-diameter portion to which the first mounting member is bonded, and a lower portion of the main rubber elastic body serving as a large-diameter portion to which the second mounting member is bonded, wherein:
   the first mounting member includes an inner recess opening onto an outer circumferential surface thereof, and the small-diameter portion of the main rubber elastic body is bonded to the inner recess,
   the main rubber elastic body has an outside diameter dimension made larger at a portion bonded to the inner recess than an outside diameter dimension of the first mounting member at a side lower than the inner recess such that the small-diameter portion of the main rubber elastic body is thick-walled by being bonded to the inner recess,
   the main rubber elastic body directly connects opposed faces of an outer circumferential surface of the inner recess and an inner circumferential surface of the second mounting member,
   the inner recess includes a deepest part having a maximum depth dimension, and the deepest part includes a curved surface of a concave shape opening radially outward,
   the inner recess includes a tapered face inclining radially outward from the deepest part toward opposite sides in an axial direction of the vibration damping device, and
   the small-diameter portion of the main rubber elastic body has an outer circumferential surface comprising a concave curved surface of a concave shape opening radially outward, and the deepest part of the inner recess is positioned lower than a deepest part of the concave curved surface.

5. The vibration damping device according to claim 1, further comprising a pressure-receiving chamber formed on an axially outer side of the large-diameter portion of the main rubber elastic body, a wall part of the pressure-receiving chamber being partially defined by the main rubber elastic body and the pressure-receiving chamber being filled with a non-compressible fluid such that pressure fluctuations arise therein during input of a vibration.

6. The vibration damping device according to claim 5, wherein an axially lower end face of the first mounting member inserted from a small-diameter side end of the main rubber elastic body into an axial inside thereof comprises a flat part extending in an axis-perpendicular direction at a center portion of the axially lower end face, and an outer circumference of the flat part has an outer-circumference chamfered shape that smoothly curves and connects with the outer circumferential surface of the first mounting member.

7. The vibration damping device according to claim 1, wherein the main rubber elastic body has an outer surface that is tapered so as to be inclined radially inward from a first position in contact with the second mounting member to a second position above the deepest part of the inner recess of the first mounting member in the axial direction.

8. The vibration damping device according to claim 1, wherein the deepest part including the curved surface of the concave shape is positioned at an axially medial portion of the inner recess.

9. The vibration damping device according to claim 4, wherein the first mounting member further includes a projecting part projecting radially outward from an upper side of the inner recess.

10. A vibration damping device comprising:
    a first mounting member;
    a second mounting member; and
    a main rubber elastic body elastically connecting the first and second mounting members, an upper portion of the main rubber elastic body serving as a small-diameter portion to which the first mounting member is bonded, and a lower portion of the main rubber elastic body serving as a large-diameter portion to which the second mounting member is bonded, wherein:

the first mounting member includes an inner recess opening onto an outer circumferential surface thereof, and the small-diameter portion of the main rubber elastic body is bonded to the inner recess, the main rubber elastic body has an outside diameter dimension made larger at a portion bonded to the inner recess than an outside diameter dimension of the first mounting member at a side lower than the inner recess such that the small-diameter portion of the main rubber elastic body is thick-walled by being bonded to the inner recess, and the first mounting member further includes a slot-shaped recess provided axially below the inner recess and opening onto the outer circumferential surface of the first mounting member, the slot-shaped recess extending in a circumferential direction, and the main rubber elastic body connects opposed faces of an outer circumferential surface of the slot-shaped recess and an inner circumferential surface of the second mounting member.

* * * * *